United States Patent
Krishnamurthy et al.

(10) Patent No.: US 9,621,718 B2
(45) Date of Patent: Apr. 11, 2017

(54) MANAGING COMMUNICATION SERVICES FOR ENABLING A DISTRIBUTED USER PRESENCE

(71) Applicant: HCL Technologies Ltd., Chennai (IN)

(72) Inventors: Shashidhar Krishnamurthy, Noida (IN); Seema Goel, Noida (IN); Saurabh Chattopadhyay, Noida (IN); Nishank Trivedi, Noida (IN)

(73) Assignee: HCL TECHNOLOGIES LTD., Chennai (IN)

(*) Notice: Subject to any disclaimer, the term of this patent is extended or adjusted under 35 U.S.C. 154(b) by 0 days.

(21) Appl. No.: 14/722,544

(22) Filed: May 27, 2015

(65) Prior Publication Data

US 2015/0350422 A1 Dec. 3, 2015

(30) Foreign Application Priority Data

May 30, 2014 (IN) .......................... 2662/CHE/2014

(51) Int. Cl.
| | |
|---|---|
| *H04M 3/42* | (2006.01) |
| *H04W 36/00* | (2009.01) |
| *H04L 29/08* | (2006.01) |
| *H04M 3/51* | (2006.01) |

(52) U.S. Cl.
CPC ........ *H04M 3/42153* (2013.01); *H04L 67/14* (2013.01); *H04W 36/0027* (2013.01); *H04M 3/42187* (2013.01); *H04M 3/5141* (2013.01)

(58) Field of Classification Search
CPC ........... H04M 3/42153; H04M 3/5141; H04M 3/42187; H04L 67/14; H04W 36/0027
USPC ...................................................... 455/414.1
See application file for complete search history.

(56) References Cited

U.S. PATENT DOCUMENTS

| | | | | |
|---|---|---|---|---|
| 2006/0288099 | A1* | 12/2006 | Jefferson | ............... H04L 12/581 709/224 |
| 2015/0099505 | A1* | 4/2015 | Kiukkonen | ............. H04W 8/22 455/419 |

* cited by examiner

*Primary Examiner* — Tanmay Shah
(74) *Attorney, Agent, or Firm* — Mannava & Kang, P.C.; Vinay Malik

(57) ABSTRACT

Managing communication services for enabling a distributed user presence and maintaining context specific configuration across the distributed presence. This invention relates to enabling use of communication devices and more particularly to enabling use of multiple applications across multiple communication devices by a user. Embodiments disclosed herein enable coordination between multiple devices and applications of a user, and thus obtain a reliable, accurate control of the various context specific configuration parameters such as user availability, call direction and barring profiles, notifications, media in use, dynamic capabilities of devices and applications, schedule and so on, while providing the user with a seamless experience across the devices and applications. Embodiments disclosed herein enable future device specific systems to efficiently manage the varying communication forms and modes.

18 Claims, 15 Drawing Sheets

MANAGING COMMUNICATION SERVICES FOR ENABLING A DISTRIBUTED USER PRESENCE

CROSS-REFERENCE TO RELATED APPLICATIONS

This application claims priority to Indian application no. 2662/CHE/2014 filed on May 30, 2014, the complete disclosure of which, in its entirety, is herein incorporated by reference.

FIELD OF INVENTION

This invention relates to enabling use of communication devices and more particularly to enabling use of multiple applications across multiple communication devices by a user.

BACKGROUND OF INVENTION

Currently, users use a variety of devices such as mobile phones, computers, tablets and so on to communicate with others. The users may also use a variety of applications such as Skype, Whatsapp, Google Hangout, Facebook, Microsoft Communicator, Yahoo Chat and so on for communication. The communication may be in the form of voice calls/chats, instant messaging, text messages, video calls/chats and so on.

These applications do not require integrating with centralized control system of circuit switched networks. These applications decouple the service plane from the network infrastructure which provides simplified development framework, making the adoption of these applications easier. To meet with the requirements, existing telecommunication signaling and control models are being extended in favor of web based protocols.

However, these applications (even if present on a single device or being used by the same user) end up competing rather than complementing each other because they are based on different underlying communication services and hence the transfer of context information from one device/application to another is nearly unachievable. Hence, these applications do not provide a true seamless end user experience.

As a real world scenario, let us consider a case of a user who is "busy" on his Skype call. As it is an important customer call and he won't like to be disturbed for the rest of the call, he wants to setup a rule for just this particular call to "Divert all calls to Voicemail". Please note, that he wants this rule to be invoked for this particular device or this particular call only. Presently this is not possible and the requirement that a particular rule to be invoked only for a particular device and be automatically revoked once the context is over is not being met current systems.

As another use case, let us consider a user who is attending a browser video call using Skype on his laptop. The user has set "call forwarding for any incoming call" preferences for this particular Skype call. As he moves away from his laptop, he transfers this Skype call to his tablet. As soon this switch happens, the call forwarding setting configured for his laptop Skype session gets lost. In order to avail these settings, they would have to be reconfigured on that mobile/tablet as currently there is no way for automatic reconfiguration or fetching previously saved settings. So as we can see, the context information, parameters and setting are not being transferred in the present way of working.

In another example, let us assume that a user has set a particular set of rules A1, A2 and A3 based on its "Busy" status for its mobile based communication and rules A1, B1 and B2 based on its "Busy" status for laptop browser based communication. If the user is "Busy" on his mobile while "Available" on browser application, just the rules A1, A2 and A3 would be in effect. But another level of complexity would be introduced if the user's status on browser based communication also changes to "Busy". There are many a questions to be answered in such a scenario such as—What should be the rules applied then? When should they take effect and when should those be revoked? What if some rules are conflicting with each other? Should there be some overlapping rules which should be applied or all of the rules should be enforced at the time of simultaneous parallel sessions?

OBJECT OF INVENTION

The principal object of this invention is to enable coordination between multiple devices and applications of a user in defined context, and thus obtain a reliable, accurate snapshot of the various parameters such as user availability, call type, media in use, schedule and so on, while providing the user with a seamless experience across the devices and applications.

STATEMENT OF INVENTION

Accordingly the invention provides a method for enabling use of at least one rule associated with a call using a device by a user, the method comprising of checking for at least one rule by a communication coordination module based on current communication state of the device; activating at least one rule by a communication service based on a first indication received from the communication coordination module on detecting at least one rule; and deactivating the at least one rule by the communication service on a subsequent indication received from the device.

Provided herein is a method for enabling use of a plurality of applications across a plurality of devices by a user, the method comprising of checking for an ongoing call by a communication coordination module, on the user starting to use a device; setting the device for the user by the communication coordination module, on the communication coordination module not detecting an ongoing call; checking if handover is required by the communication coordination module, on the communication coordination module detecting an ongoing call; setting up a communication context by the communication coordination module, if handover is not required; fetching data structure of previous device used by the user by the communication coordination module, if handover is required; applying the fetched data structure to the device by the communication coordination module; sending an indication by the device to the communication coordination module, on handover being completed; and marking the fetched data structure as obsolete by the communication coordination module, on the communication coordination module receiving the indication.

Provided herein is a system for enabling use of at least one rule associated with a call using a device by a user, the system comprising of a communication coordination module, the system configured for checking for at least one rule by the communication coordination module based on current communication state of the device; activating at least one rule by a communication service based on a first indication received from the communication coordination module on detecting at least one rule; and deactivating the at least one rule by the communication service on a subsequent indication received from the device.

Provided herein is a system for enabling use of a plurality of applications across a plurality of devices by a user, the system comprising of a communication coordination module, the communication coordination module configured for checking for an ongoing call, on the user starting to use a device; setting the device for the user, on the communication coordination module not detecting an ongoing call; checking if handover is required, on the communication coordination module detecting an ongoing call; setting up a communication context, if handover is not required; fetching data structure of previous device used by the user, if handover is required; applying the fetched data structure to the device; and marking the fetched data structure as obsolete by the communication coordination module, on the communication coordination module receiving an indication from the device that handover is completed.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, through out which like reference letters indicate corresponding parts in the various figures. The embodiments herein will be better understood from the following description with reference to the drawings, in which.

DETAILED DESCRIPTION OF INVENTION

Figure 1A:
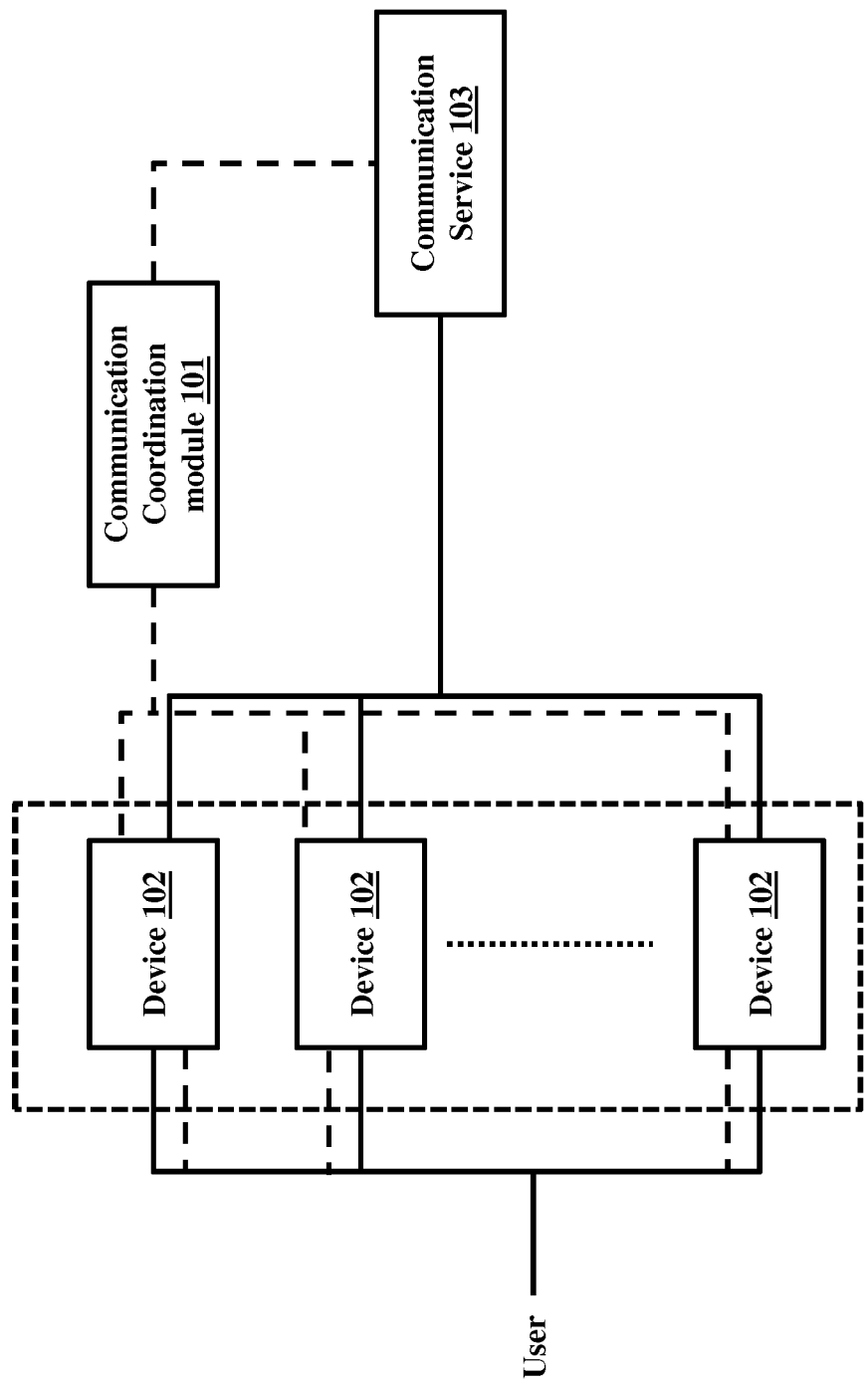
FIG. 1a depicts a plurality of devices belonging to a user, wherein the coordination is done across a single application running on the plurality of devices, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein enable coordination between multiple devices and applications of a user, and thus obtain a reliable, accurate snapshot of the various parameters such as user availability, call type, media in use, schedule and so on, while providing the user with a seamless experience across the devices and applications. Referring now to the drawings, and more particularly to FIGS. 1 through 10, where similar reference characters denote corresponding features consistently throughout the figures, there are shown preferred embodiments.

The real world communication calls always have some context attached to them. Although, from the technical implementation point of view, these communication calls may appear to be isolated; but it is not the case if these scenarios are observed from the perspective of an end user who is involved in multiple simultaneous calls. At the very least, each and every session involvement defines the availability status for the user and hence it is imperative that these multiple states of the user are taken care of while handling the session. So as to cater to the configurations and user preferences which are dependent on call states of a user this requirement attains even greater importance. Embodiments disclosed herein use the call state information from all the devices on which the user is present.

As an example, consider a case when the user is "busy" on a browser call while "available" on an IM application running on his mobile. The user configures a rule for the forthcoming or ongoing call which says "Bar communication when Busy on this browser call". In that case, if another user tries to contact him via IM during that particular call, the other user would not be allowed to contact him, as the communication to the IM also falls under the user presence purview and embodiments disclosed herein acts accordingly. As soon as the particular browser call is completed, the collated status for the user reverts to "Available" and any future incoming calls would be handled accordingly.

Figure 1B:
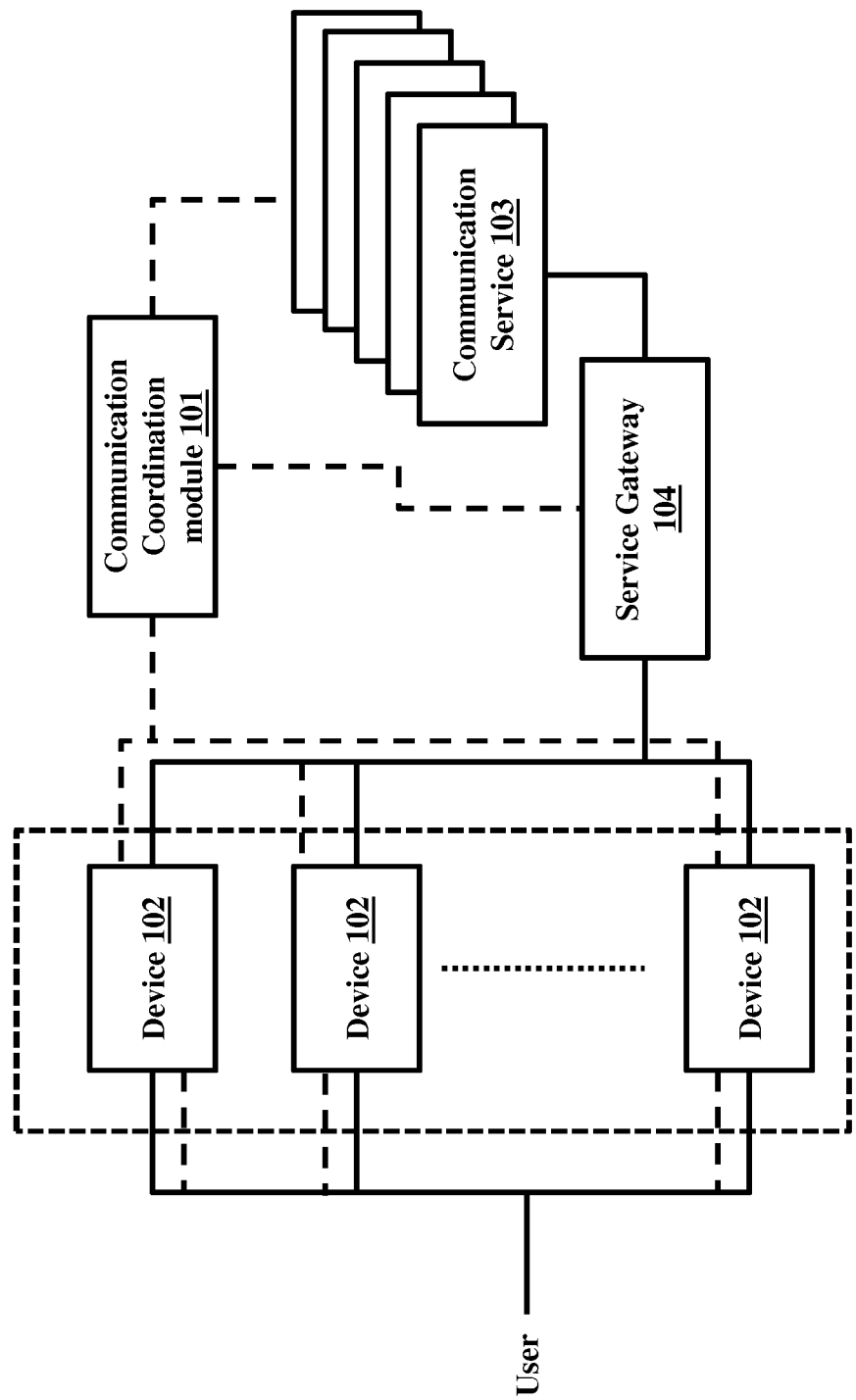
FIG. 1b depicts a plurality of devices belonging to a user, wherein the coordination is done across a plurality of applications running on the plurality of devices, according to embodiments as disclosed herein.

FIG. 1a depicts a plurality of devices belonging to a user, wherein the coordination is done across a single application running on the plurality of devices, according to embodiments as disclosed herein. FIG. 1b depicts a plurality of devices belonging to a user, wherein the coordination is done across a plurality of applications running on the plurality of devices, according to embodiments as disclosed herein.

The devices 102 may be running a common application, wherein the application enables the user to communicate with at least one other user and/or entity. The device 102 may be a computer, a mobile phone, a tablet, a wearable device (such as a smart watch) and so on. The application may be an application that may enable the user to communicate using at least one of a voice call/chat, Instant Messaging (IM), video call/chat, audio conferencing, video conferencing and so on. The application may be a dedicated application or a web browser based application.

The user may be communicating using a common application for communication across all the devices (as depicted in FIG. 1a). The user may be using a plurality of applications for communication (as depicted in FIG. 1b).

As depicted in FIG. 1a, a communication coordination module 101 may communicate to the multiple devices belonging to the user (depending on the presence of the application being currently used by the user on each of the devices and the capabilities of each of the devices). The communication coordination module 101 may communicate a coordination request to the communication service 103. The coordination request may be received from the user. The coordination request may also be received from the application and/or the device, on at least one triggering condition being satisfied. Further, the communication coordination module 101 may also store the coordination request and details received along with the coordination request.

As depicted in FIG. 1b, a service gateway 104 converge the communication capabilities between the plurality of applications present on the device 102. The service gateway 104 enables the plurality of applications to mediate and interoperate with each other, which is required to enable the applications to operate in a converged manner. The service gateway 104 may receive the coordination request. The coordination request may be received from the user. The coordination request may also be received from the application and/or the device, on at least one triggering condition being satisfied. While passing on the coordination request to the invented Framework, the service gateway 104 collates input datasets from the plurality of UEs. The service gateway 104 further communicates the coordination request to the communication coordination module 101. Further, the communication coordination module 101 may also store the coordination request and details received along with the coordination request.

Figure 2:
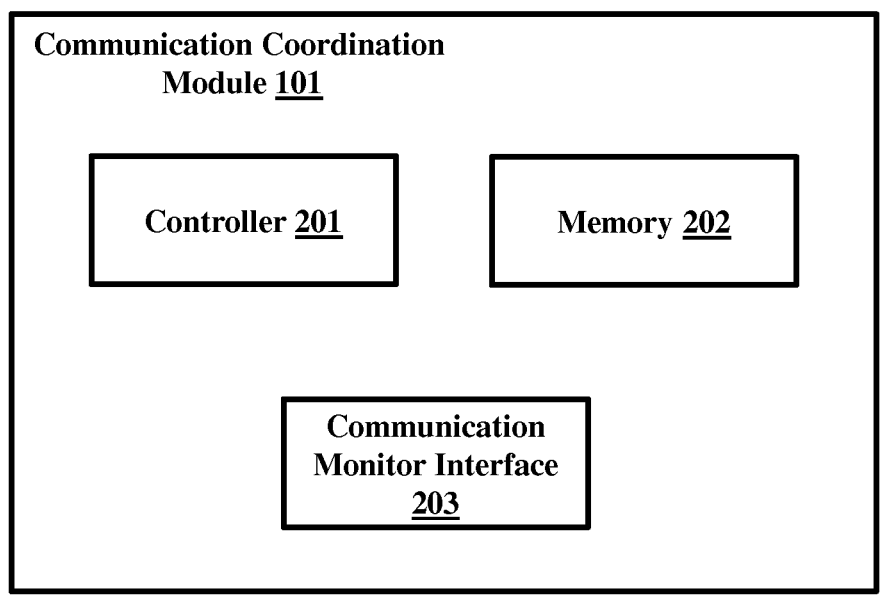
FIG. 2 depicts the communication coordination module, according to embodiments as disclosed herein.

FIG. 2 depicts the communication coordination module, according to embodiments as disclosed herein. The communication coordination module 101 comprises of a controller 201, a memory 202 and a communication monitor interface 203. The memory 202 may be present internal to the communication coordination module 101. The memory 202 may be present external to the communication coordination module 101 and may communicate with the communication coordination module 101 using a suitable communication means such as a wired connection, a wireless connection and so on. The memory 202 may be a database, associated with the communication coordination module 101. The communication monitor interface 203 may enable the communication coordination module 101 to monitor the communication with external entities such as the UEs 102, the communication service 103, the service gateway 104 and so on. The communication monitor interface 203 may use at least one of a wired means or a wireless means to communicate with the external entities.

Figure 3:
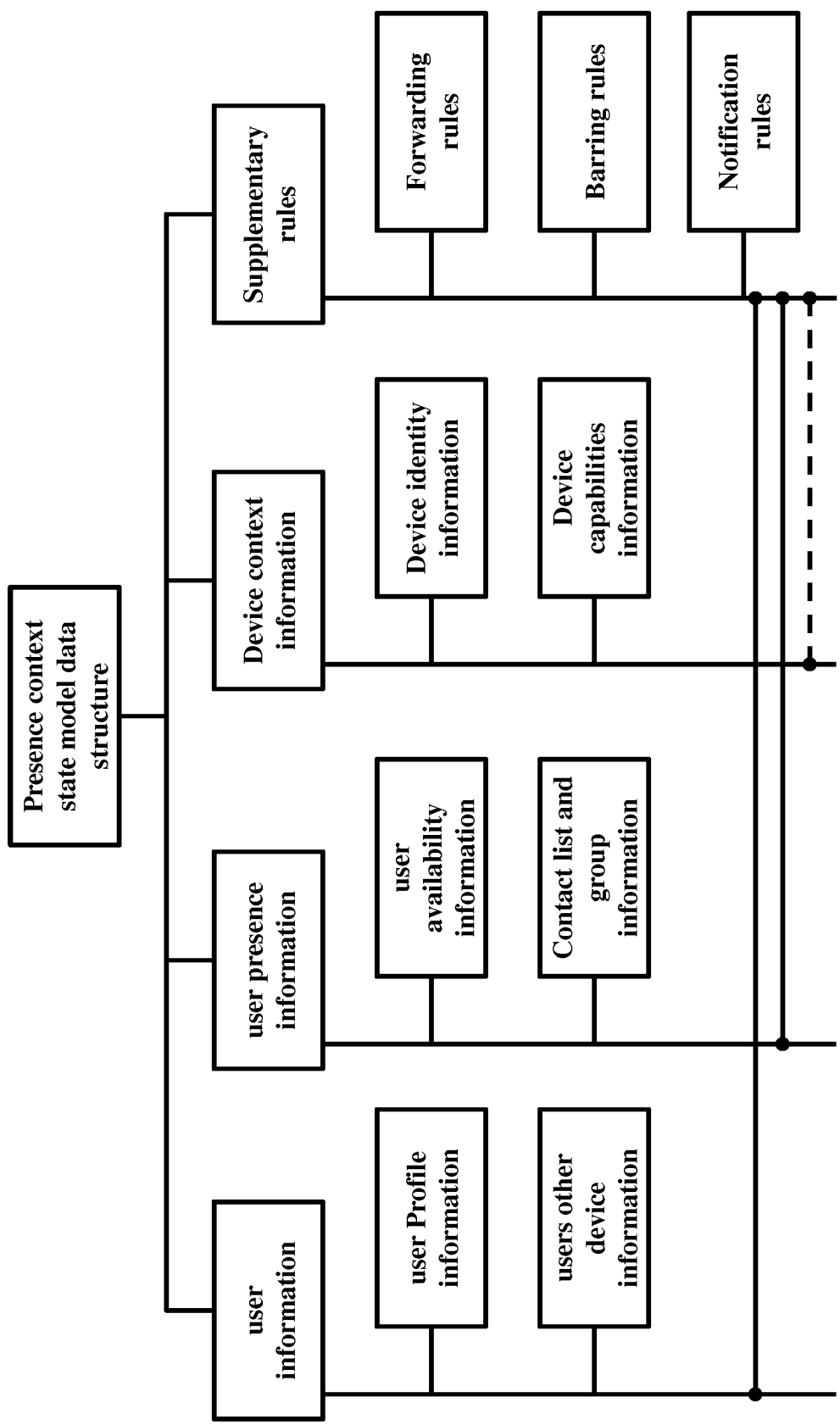
FIG. 3 depicts the data structure used for storing the information of a user in the communication coordination module, according to embodiments as disclosed herein.

The memory 202 may comprise of information related to the user. The information may be stored as a data structure (as depicted in FIG. 3). The data structure comprises of the following fields: user info, user presence info, device context information and supplementary rule info.

The user information field contains information related to the profile of the user (user profile information field) and other devices belonging to the user (users other device information field). The user profile information field comprises of details such as IMEI, Unique URI, Service Provider Information (if applicable) and so on of the primary device of the user. The user may select the primary device. The first device used by the user may be considered as the primary device. The user may change the primary device at any point. The users other device information field comprises of information about the devices being used by the user, other than the primary device.

The user presence information field comprises of the user availability information from the primary device. The communication coordination module 101 may keep the user presence information field updated, based on information received from the primary device. The user presence information field further comprises of contact lists & group information from each of the devices.

The device context information field comprises of the identities of all the devices being used by the user and the capabilities and applications present on each device. The device capabilities information field stores a means to uniquely identify each device such as a device ID and so on.

The supplementary rule information field stores information, as configured by the user. The information configured by the user may comprise of rules, preferences for his current and/or future communications. The rules and/or preferences may be a diversion rule, wherein the user may set options and rules related to call forwarding, calls from a specific number to be forwarded, a particular type of call to be forwarded (such as depending on the mode of the call such as video call and so on), forwarding specific and/or all calls based on the location of the user if the user is moving during the call (while user reaches to his office premises, at home, at a movie theater and so on). The rule may be a barring rule, wherein the user may set options and rules related to barring calls, calls from a specific number to be barred, a particular type of call to be barred (such as depending on the mode of the call such as video call and so on), barring specific and/or all calls based on the location of the user if the user is moving during the call (while user reaches to his office premises, at home, at a movie theater and so on). The rule may also be a notification rule, wherein the user opts on whether he wants to be notified when a rule is applied.

The data structure may comprise of a plurality of associations between the fields. The associations may be mandatory or optional. In an example, if fields A and B have mandatory association, it means that in order for field B to exist, field A must be present. If fields A and B have optional association, in order for field B to exist, field A may/may not be present. The user information and supplementary rules field have a mandatory association. The user presence information and supplementary rules fields have a mandatory association. The device context information and supplementary rules fields have an optional association.

The controller 201 may receive rules and/or preferences, as set by the user. The controller 201 may store the preferences and/or rules in the respective data structure. The controller 201 may also update the data structure, as and when information related to the user and/or devices gets updated. The controller 201 may communicate directly with the devices 102. The controller 201 may also communicate with the devices through the service gateway 104.

The controller 201, on receiving an indication from the device 102 of a change in communication state of the device (the communication state may be active (a call is ongoing) or inactive (no call is currently ongoing)), check if at least one rule is associated with the current communication state. If at least one rule is associated with the current communication state, the controller 201 takes an action related to the at least one rule by registering the action on the stream. If the rule is active, the controller 201 may deactivate the rule by registering the rule deactivation on the stream. If the rule is not active, the controller 201 may activate the rule by registering the rule activation on the stream. The controller 201 may also activate at least one rule received from the device, for an ongoing call; wherein the rule is received from the device when the call is ongoing.

'Call' herein may refer to a communication session between the user and at least one other user, with the user using at least one of the devices to communicate with at least one other user. The communication session may be at least one of a voice call/chat, a video call/chat, a voice conference, a video conference, a text messaging session, an IM session and so on.

The controller 201 may enable handover of communication sessions belonging to the user across a plurality of devices. The controller 201 may detect the user switching to a different device. On detecting the presence of a new device, the controller 201 may check if the user has an ongoing call. On detecting an ongoing call, the controller 201 may perform a handover of the ongoing call from the previous device being used by the user to the device being currently used by the user. The controller 201 may also apply at least one supplementary rule, based on the device capabilities common between the previous device being used by the user and the device being currently used by the user.

The controller 201 may also coordinate calls made by a plurality of applications present on a plurality of devices, belonging to the user. The controller 201 may also coordinate calls made by a plurality of applications present on a plurality of devices, belonging to the user, when supplementary rules are associated with user information (and not associated with user presence information and device context). The controller 201 may also coordinate calls made by a plurality of applications present on a plurality of devices, belonging to the user, when the supplementary rules are associated with user presence information (and not associated with device context information). The controller 201 may also coordinate calls made by a plurality of applications present on a plurality of devices, belonging to the user, when supplementary rules are associated with the device context information.

Figure 4:
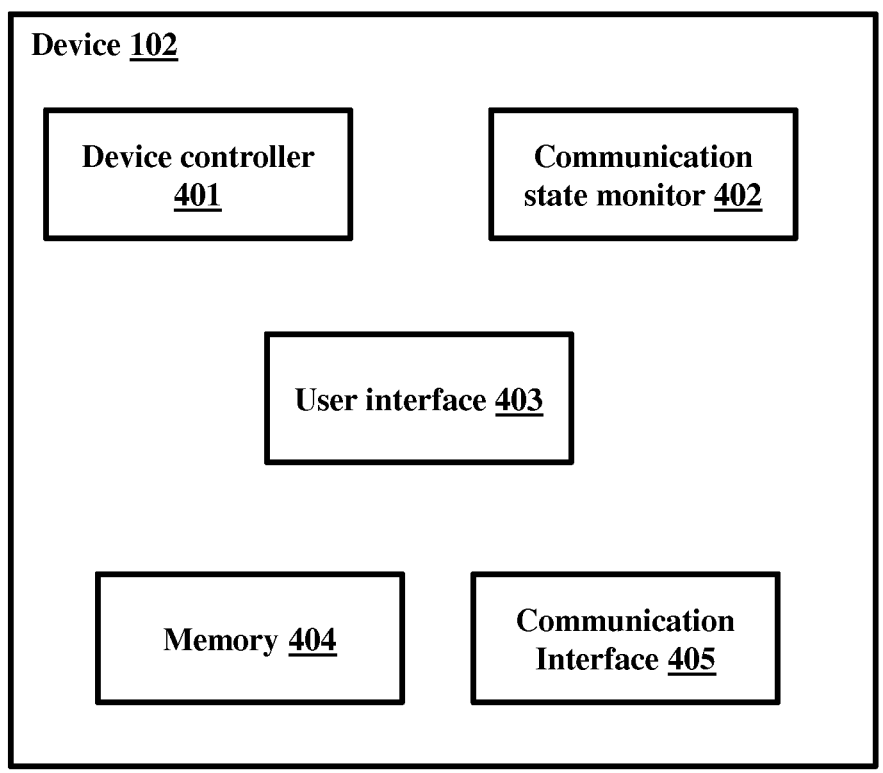
FIG. 4 depicts a device configured for enabling a user to make a call to at least one other user, according to embodiments as disclosed herein.

FIG. 4 depicts a device configured for enabling a user to make a call to at least one other user, according to embodiments as disclosed herein. The device 102 may comprise of a device controller 401, a communication state monitor 402, a user interface 403, a memory 404 and a communication interface 405.

The user interface 403 enables the user of the device to set at least one preference and/or rule. The user interface 403 may also enable the user to set the at least one preference and/or rule during a call, wherein the user may opt to apply the preference to ongoing call, only to the next call, only to the calls made within a specific context and so on. The user interface 403 may also enable the user to set the at least one preference and/or rule before a call, wherein the user may opt to apply the preference to ongoing call, only to the next call, only to the calls made within a specific context and so on. The user interface 403 may enable the user to update the at least one preference and/or rule at any point in time. The memory 404 may be used to store at least one preference and/or rule as set by the user.

On the user setting a preference and/or controller, the device controller 401 may store the at least one preference and/or rule in the memory 404. The device controller 401 may communicate the at least one preference and/or rule to the communication coordination module 101, directly or through the service gateway 104.

The communication state monitor 402 may monitor the current communication state of the device 102 (the communication state may be active (a call is ongoing) or inactive (no call is currently ongoing)). On detecting a change in the communication state of the device 102 (on a call being initiated or the call being stopped), the communication state monitor 402 may send an indication to the device controller 401. The device controller 401 may send the indication to the communication coordination module 101 directly or through the service gateway 104.

The communication state monitor 402 may monitor handovers from another device. The communication state monitor 402 may check if the handover is completed or not. On detecting that the handover is completed, the communication state monitor 402 may inform the device controller 401. The device controller 101 may inform that the handover is complete to the communication coordination module 101.

Figure 5A:
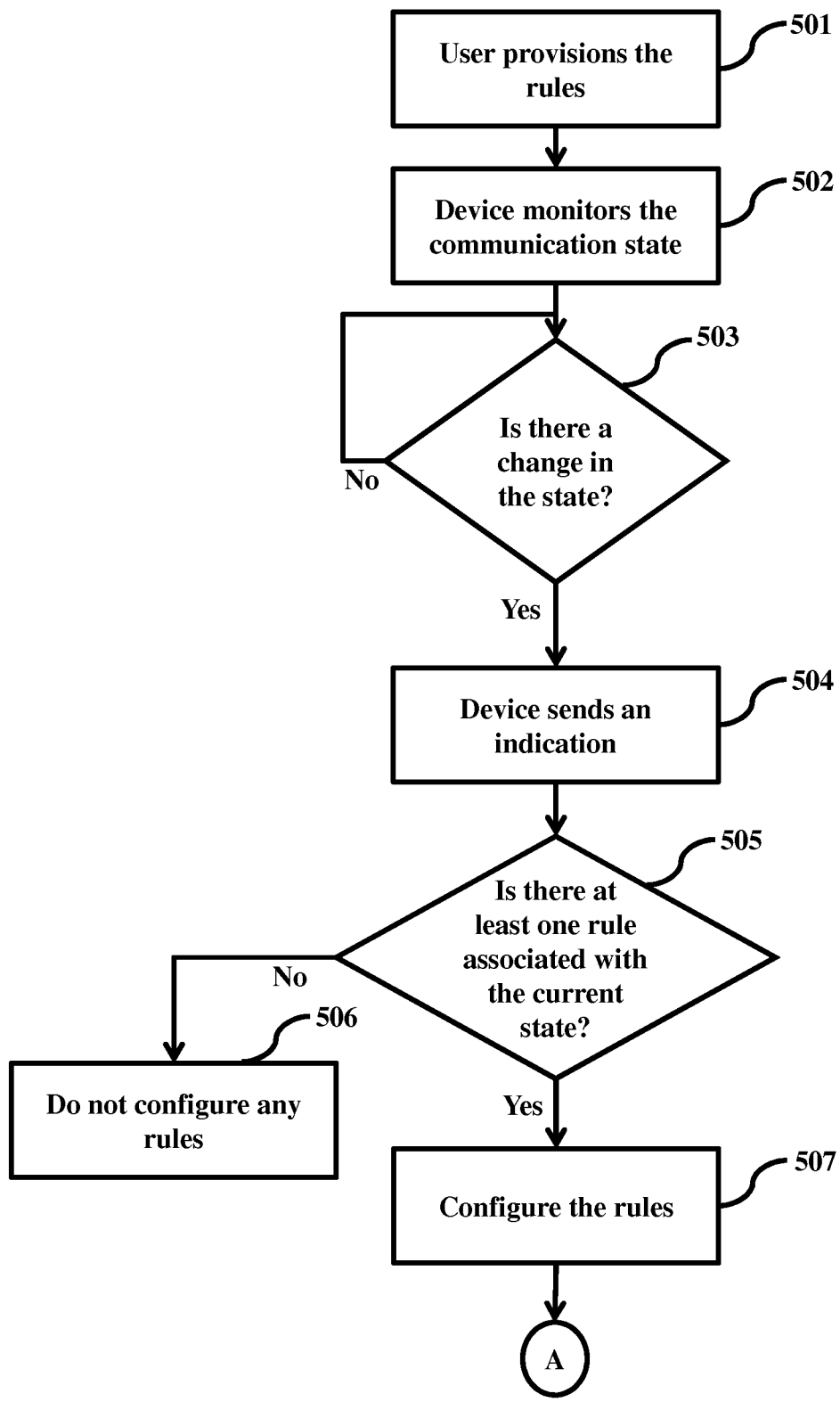
FIGS. 5a, 5b and 5c are flowcharts illustrating the process of synchronizing the communication state for a device when a call is not ongoing, according to embodiments as disclosed herein.
Figure 5B:
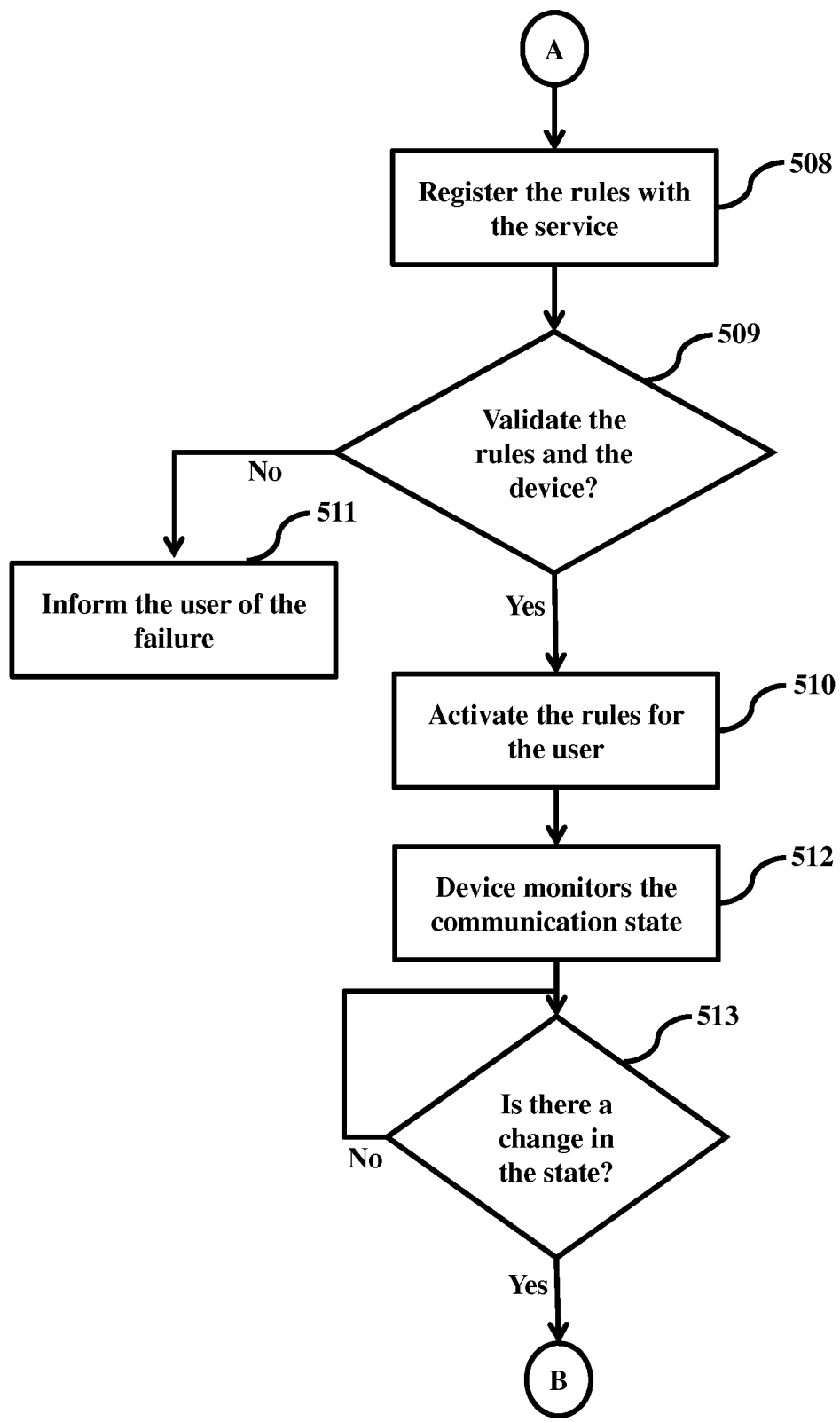
Figure 5C:
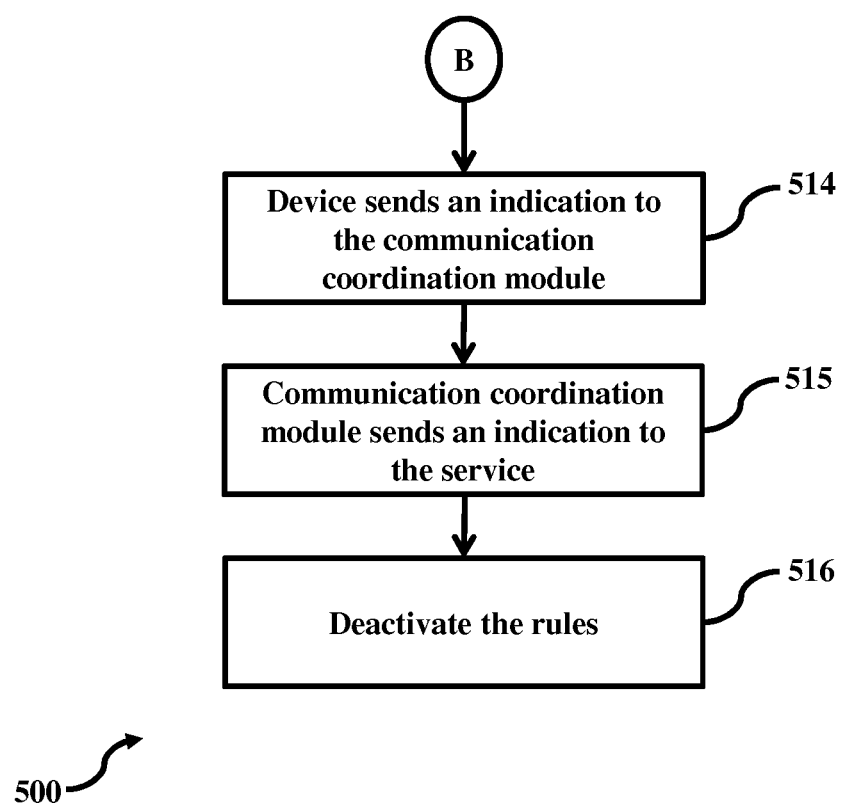

FIGS. 5a, 5b and 5c are flowcharts illustrating the process of synchronizing the communication state for a device when a call is not ongoing, according to embodiments as disclosed herein. The user provisions (501) the rules using the device 102. The user may provision rules only for the ongoing call, or the next call, only calls made within a specified context and so on. The device 102 monitors (502) the communication state. On detecting (503) a change in the communication state (a change from a previous communication state to a current communication state, wherein the previous communication state may be 'no calls ongoing' and the current communication state may be 'call initiated'), the device 102 sends (504) an indication to the communication coordination module 101. The communication coordination module 101 checks (505) if at least one rule is associated with the current communication state. If at least one rule is not associated with the new communication state, the communication coordination module 101 does (506) not configure any rule. On detecting at least one rule associated with the current communication state, the communication coordination module 101 configures (507) the at least one rule by registering (508) the at least one rule with the communication service 103. The communication service 103, on receiving a request from the communication coordination module 101, validates (509) the rules and the device. On validation, the communication service 103 activates (510) the rules for the user. If the rules and the device cannot be validated, the communication service 103 informs (511) the user of the failure. The device 102 monitors (512) the communication state. On detecting (513) a change in the communication state (a change from a previous communication state to a current communication state, wherein the previous communication state may be 'calls ongoing' and the current communication state may be 'call released'), the device 102 sends (514) an indication to the communication coordination module 101.

On receiving the indication, the communication coordination module 101 initiates the de-provisioning and de-activation of the rules by sending (515) an indication to the communication service 103. The communication service 103, on receiving the indication from the communication coordination module 101, deactivates (516) the rules for the user. In an embodiment herein, the rules may be deactivated on receiving an instruction from the user at any point in time. The various actions in method 500 may be performed in the order presented, in a different order or simultaneously. Further, in some embodiments, some actions listed in FIGS. 5a, 5b and 5c may be omitted.

Figure 6A:
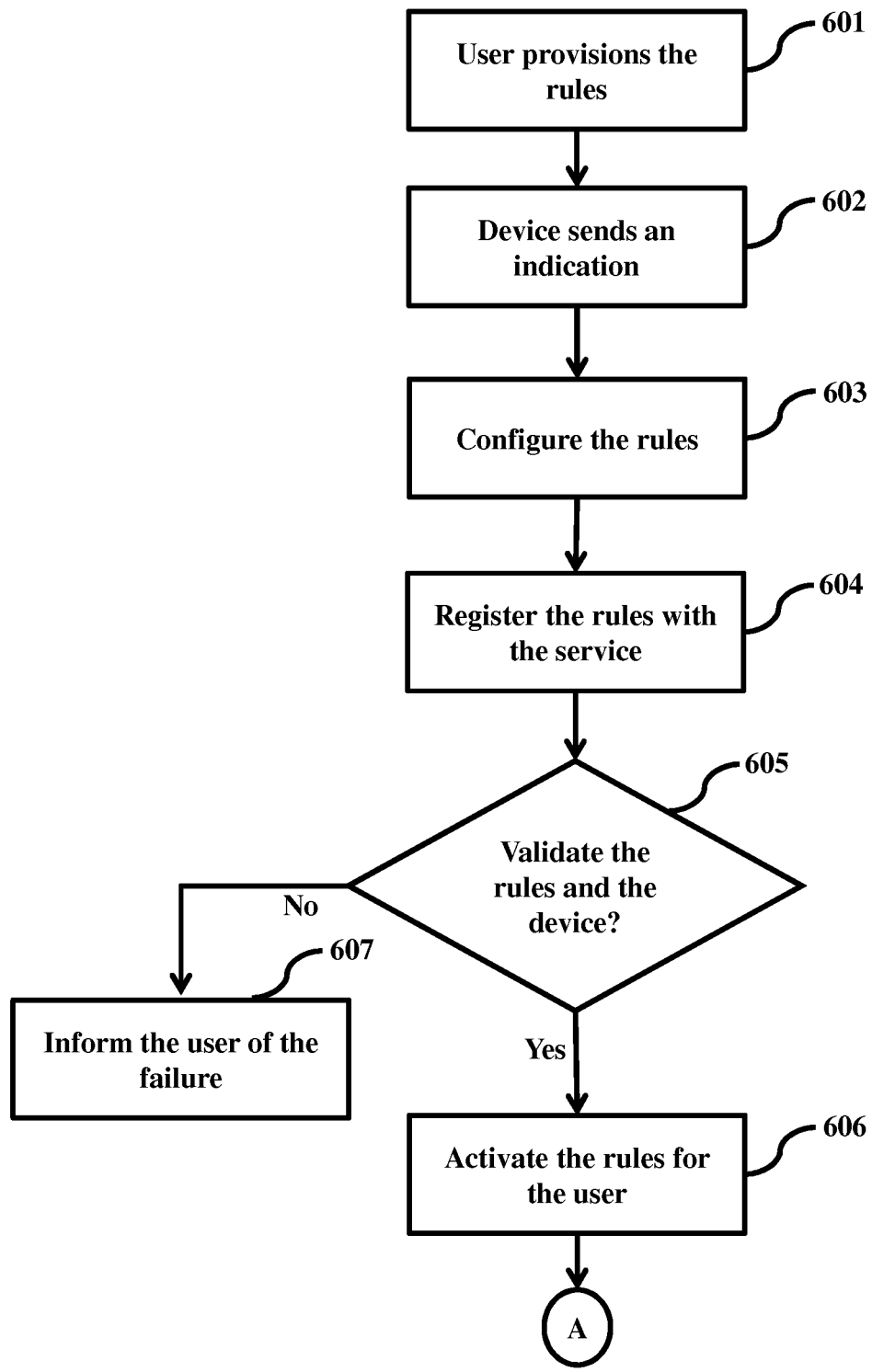
FIGS. 6a and 6b are flowcharts illustrating the process of synchronizing the communication state for a device when a call is ongoing, according to embodiments as disclosed herein.
Figure 6B:
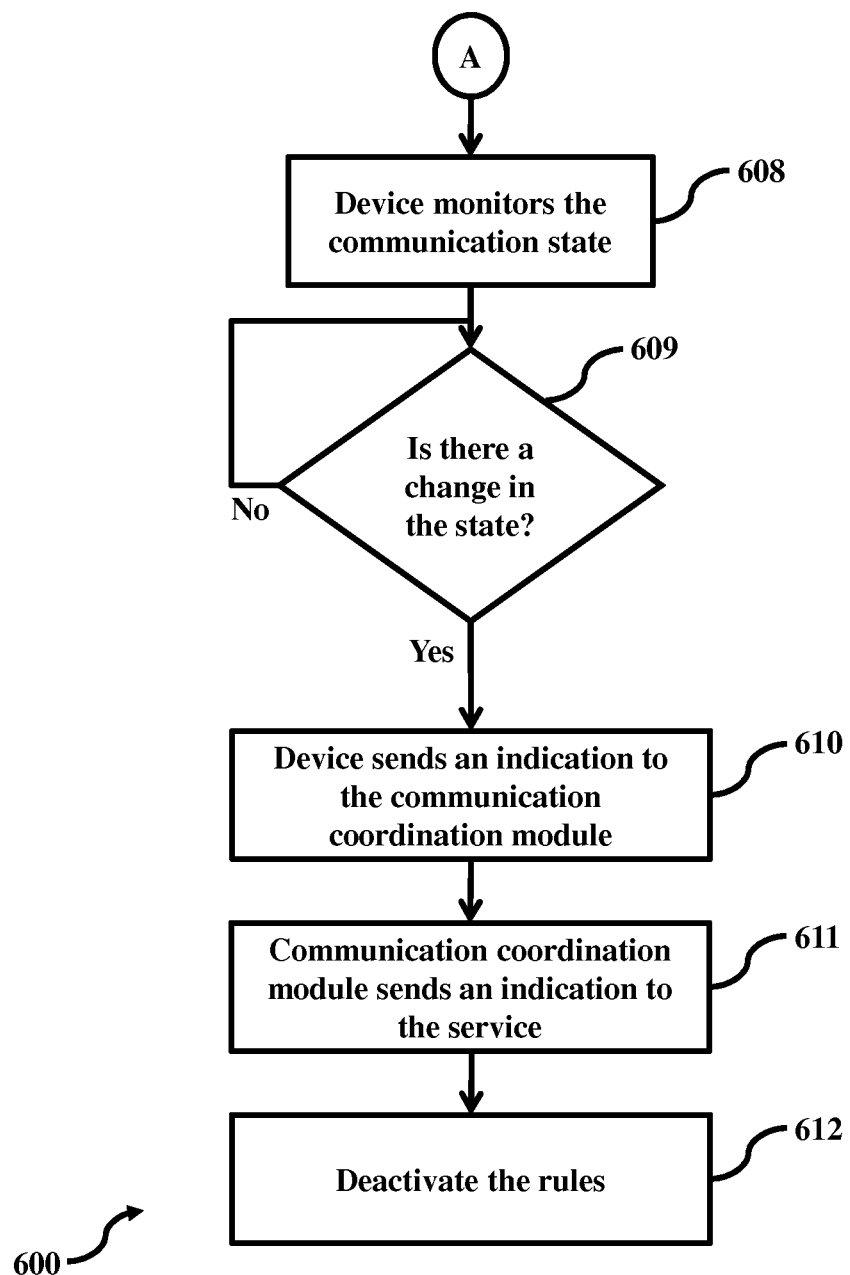

FIGS. 6a and 6b are flowcharts illustrating the process of synchronizing the communication state for a device when a call is ongoing, according to embodiments as disclosed herein. The user provisions (601) the rules using the device 102, when the call is ongoing. The user may provision rules for all the devices using a single device. The user may also provision rules for all the devices on each of the respective devices. The user may provision rules for all the devices using a single device. The user may also provision rules for all the devices on each of the respective devices. The user may provision rules only for the current call, only calls made within a specified context and so on. The device 102 sends (602) an indication to the communication coordination module 101. The communication coordination module 101 configures (603) the at least one rule by registering (604) the at least one rule with the communication service 103. The communication service 103, on receiving a request from the communication coordination module 101, validates (605) the rules and the device. On validation, the communication service 103 activates (606) the rules for the user. If the rules and the device cannot be validated, the communication service 103 informs (607) the user of the failure. The device 102 monitors (608) the communication state. On detecting (609) a change in the communication state (a change from a previous communication state to a current communication state, wherein the previous communication state may be 'calls ongoing' and the current communication state may be 'call released'), the device 102 sends (610) an indication to the communication coordination module 101. On receiving the indication, the communication coordination module 101 initiates the de-provisioning and de-activation of the rules by sending (611) an indication to the communication service 103. The communication service 103, on receiving the indication from the communication coordination module 101, deactivates (612) the rules for the user. In an embodiment herein, the rules may be deactivated on receiving an instruction from the user at any point in time. The various actions in method 600 may be performed in the order presented, in a different order or simultaneously. Further, in some embodiments, some actions listed in FIGS. 6a and 6b may be omitted.

Figure 7A:
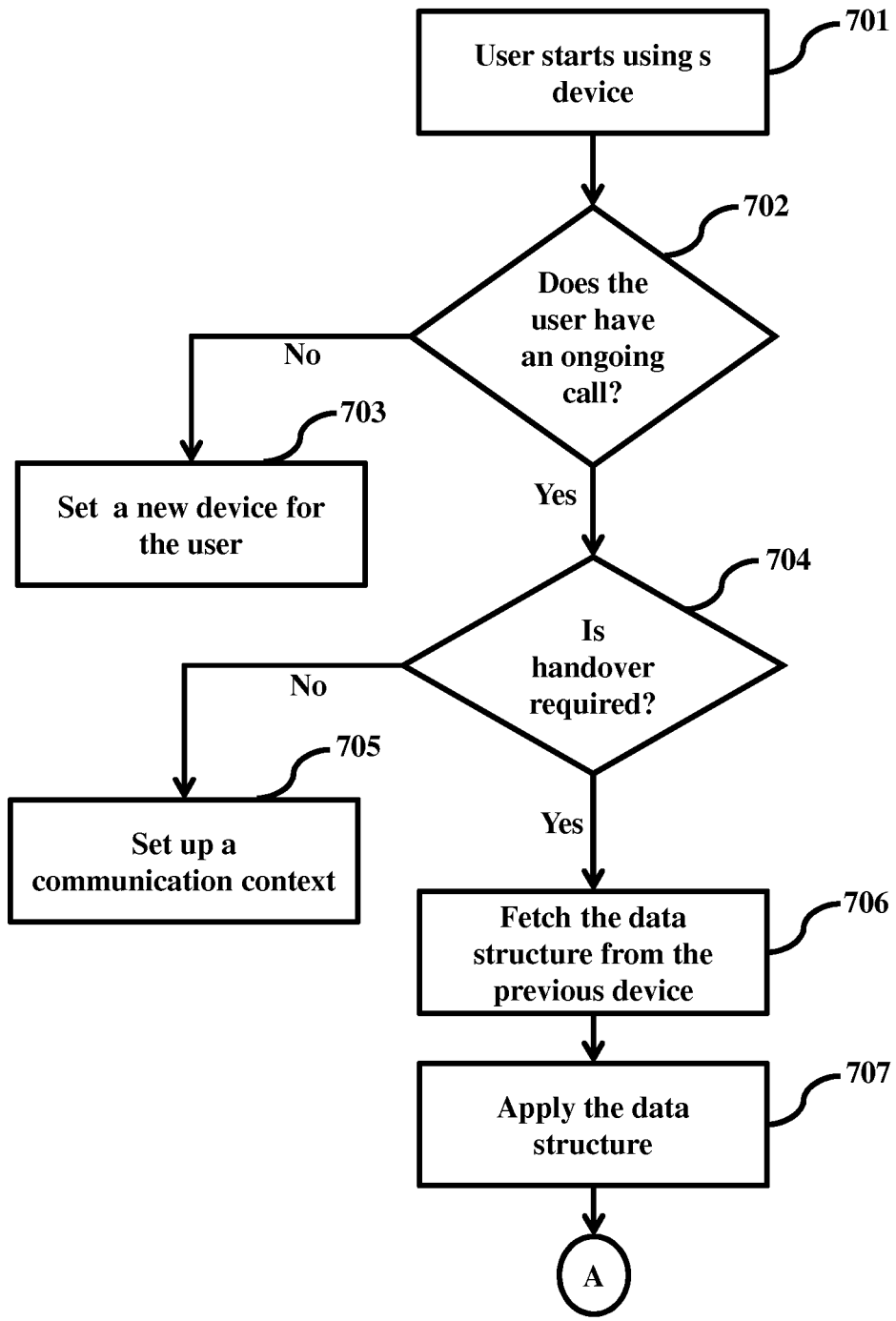
FIGS. 7a and 7b are flowcharts illustrating the process of performing handover across a plurality of devices, according to embodiments as disclosed herein.
Figure 7B:
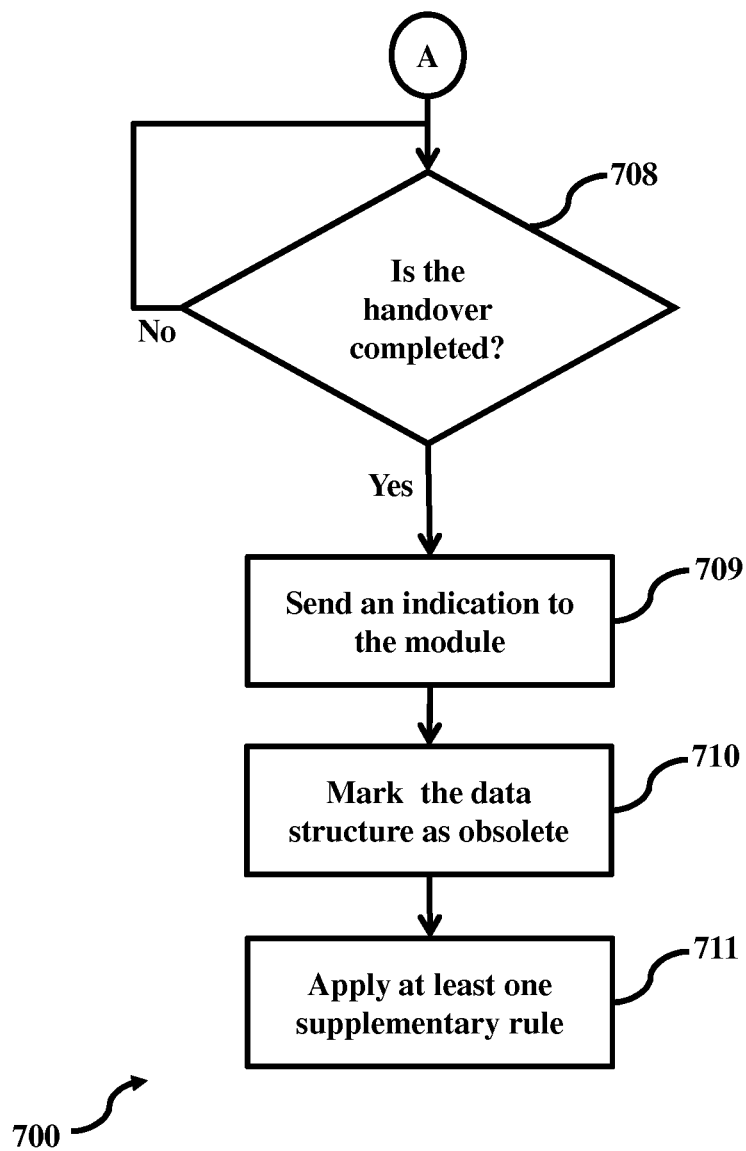

FIGS. 7a and 7b are flowcharts illustrating the process of performing handover across a plurality of devices, according to embodiments as disclosed herein. As the user starts (701) using a specific device (hereinafter referred to as current device), the communication coordination module 101 checks (702) if any call is ongoing for this user from any other device (hereinafter referred to as previous device). If the communication coordination module 101 does not detect any ongoing calls for this user, the communication coordination module 101 sets up (703) a new device for the user. If the communication coordination module 101 detects an ongoing call, the communication coordination module 101 checks (704) if handover across devices is required. If the communication coordination module 101 detects that no handover is required, then the communication coordination module 101 sets up (705) a communication context, hereby enabling the user to initiate or receive calls. If handover is required, the communication coordination module 101 fetches (706) the data structure from the previous device. The communication coordination module 101 further applies (707) the data structure from the previous device in the current device, based on the capabilities of the current device. This ensures that features which are restricted/not supported on the current device are applied or blocked. The device checks (708) if the handover is completed. On detecting that the handover is completed, the device sends (709) an indication to the communication coordination module 101. The communication coordination module 101 marks (710) the data structure of the previous device as obsolete. The communication coordination module 101 may wait for a pre-defined time interval for the indication, wherein the pre-defined time interval may be defined by the user. If the indication has not been received within the pre-defined time interval, the communication coordination module 101 may consider that the handover has failed. The communication coordination module 101 further applies (711) at least one supplementary rule based on device capabilities that are common between the previous device and the current device. For example, if a handover is initiated from Device_1 to Device_2, then a decision is taken based on the device Capabilities which are common to Device_1 as well as Device_2. If a handover is initiated from Device_1 to Device_2, while capabilities (Device_1) capabilities (Device_2), supplementary Rules associated with Device_1 will be handed over to Device_2 applying the following $$Suppl\_Rules^{Device1\_capability} \cap Suppl\_Rules^{Device2\_capability}$$

Here, intersecting device capabilities are identified by the communication coordination module 101, the supplementary rules which could be applied based on this set of device capabilities are collated and enforced by the communication coordination module 101. The various actions in method 700 may be performed in the order presented, in a different order or simultaneously. Further, in some embodiments, some actions listed in FIGS. 7a and 7b may be omitted.

Figure 8:
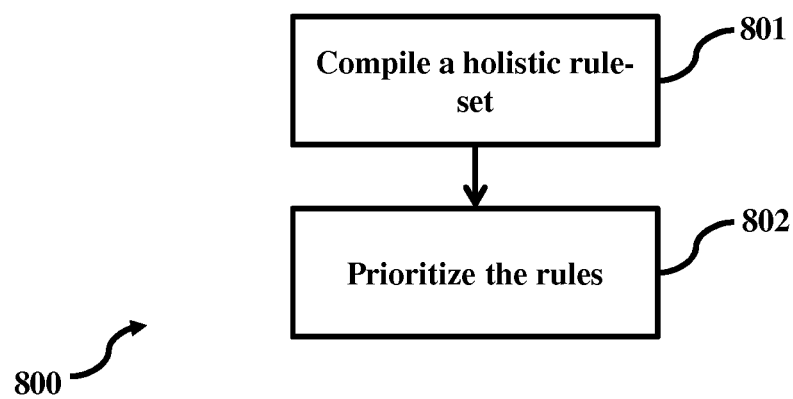
FIG. 8 is a flowchart illustrating the process of a user using a plurality of applications present across a plurality of devices, wherein supplementary rules may be associated with the user information, according to embodiments as disclosed herein.

FIG. 8 is a flowchart illustrating the process of a user using a plurality of applications present across a plurality of devices, wherein supplementary rules may be associated with the user information, according to embodiments as disclosed herein. Consider a scenario where the supplementary rules are associated with the user information (and not associated with the user presence information and the device context information). The communication coordination module 101 compiles (801) a holistic rule-set for all the supplementary rules running on all the devices by $$Gen\_Suppl\_Rules^{device1} \cup Gen\_Suppl\_Rules^{device2} \cup Gen\_Suppl\_Rules^{device3} \ldots$$

If there is a coexistence of certain rules produce conflicting conditions, the communication coordination module 101 prioritizes (802) the rules based on pre-configured criteria as set by the user. In a first criterion, the user may set precedence based on higher degree of severity of presence state. Here, for example, a user may configure the precedence hierarchy; where "Do not disturb" state is of highest precedence followed by "Busy" followed by "Available" and then by "Away" state and finally the "offline" state. In a second criterion, the user may set precedence as per more recent rule definition. Here, a user may select whether a state based on which a recent rule was set, is of the highest precedence. For example, if the user most recently has set the rules from an application on device (PD3), the state of PD3 will be assumed to be the most up-to-date definition of user's presence state and will be considered of higher precedence. The user may also configure such that whichever latest state was set upon by the user takes the highest precedence. The various actions in method 800 may be performed in the order presented, in a different order or simultaneously. Further, in some embodiments, some actions listed in FIG. 8 may be omitted.

Figure 9:
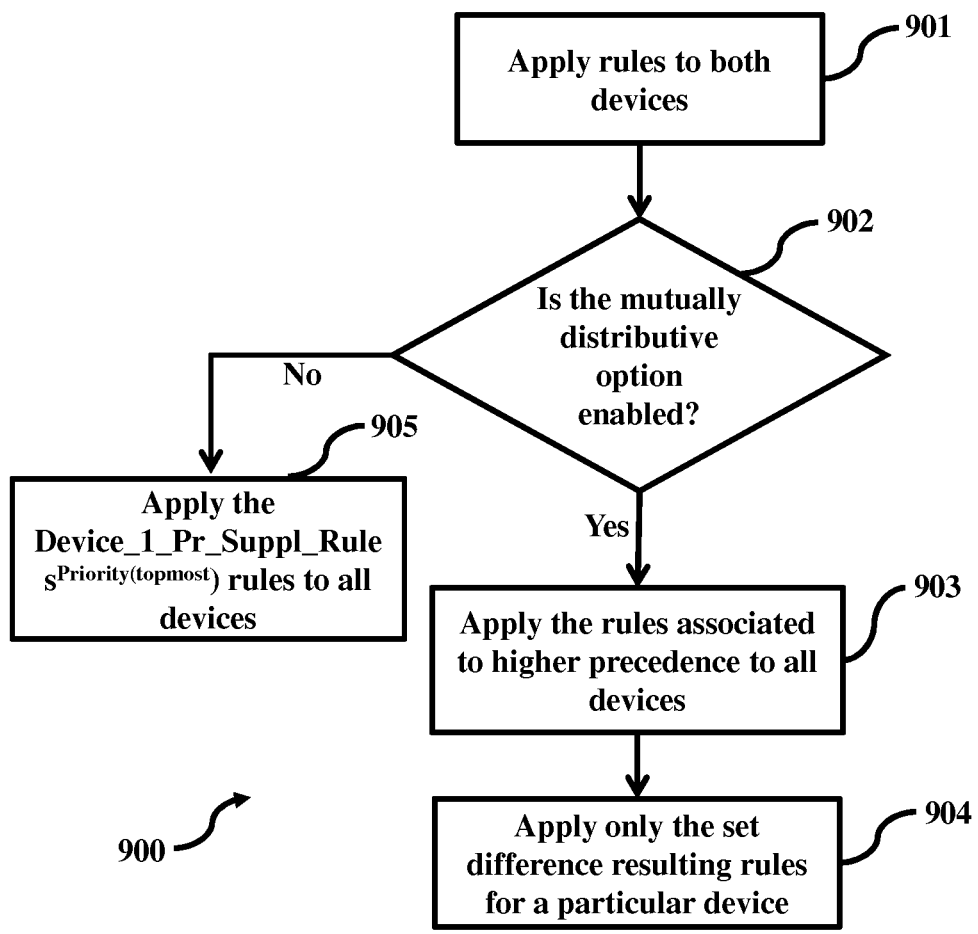
FIG. 9 is a flowchart illustrating the process of a user using a plurality of applications present across a plurality of devices, wherein supplementary rules may be associated with the user presence information, according to embodiments as disclosed herein.

FIG. 9 is a flowchart illustrating the process of a user using a plurality of applications present across a plurality of devices, wherein supplementary rules may be associated with the user presence information, according to embodiments as disclosed herein. Consider a case where supplementary rules are associated with the user presence information (and not associated with the device context information), as provisioned during multiple ongoing calls. The communication coordination module 101 applies (901) rules to both the current device (device_2) and the previous device (device_1). The rules may be associative to the device. The aggregation of the rules may satisfy the following criteria:

a configurable option to define precedence of presence states (Severest state/Most recent to take precedence)

a configurable option for mutually distributive adoption of rules sets provided by:

$$Device\_2\_Pr\_Suppl\_Rules^{Priority(topmost-N)} \setminus Device\_1\_Pr\_Suppl\_Rules^{Priority(topmost)}$$

wherein the resulting rules of the above equation will be applied specific to device_2, if these rules are associative to the device.

$$Device\_1\_Pr\_Suppl\_Rules^{Priority(topmost)}$$

wherein the resulting rules may be applied to both Device_1 and Device_2, if these rules are associative to the device.

On applying the rules, the communication coordination module 101 checks (902) if the 'mutually distributive' option is enabled. If the 'mutually distributive' option is enabled, the communication coordination module 101 applies (903) the rules associated to higher precedence to all devices. The communication coordination module 101 applies (904) only the set difference resulting rules for a particular device (while the difference is measured against the rules of top priority device) will be applied to that particular device. If the 'mutually distributive' option is not enabled, the communication coordination module 101 applies (905) the Device_1_Pr_Suppl_Rules$^{Priority(topmost)}$ rules to all devices. The various actions in method 900 may be performed in the order presented, in a different order or simultaneously. Further, in some embodiments, some actions listed in FIG. 9 may be omitted.

Figure 10:
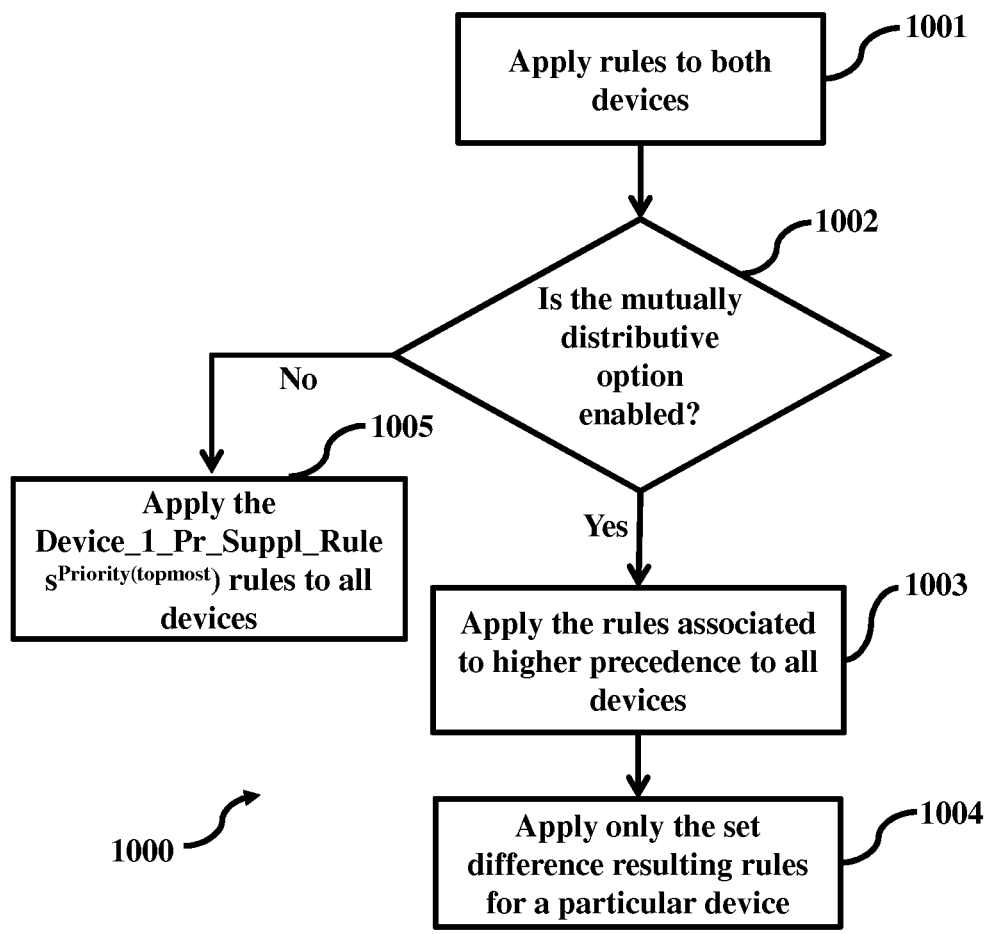
FIG. 10 is a flowchart illustrating the process of a user using a plurality of applications present across a plurality of devices, wherein supplementary rules may be associated with the device context information, according to embodiments as disclosed herein.

FIG. 10 is a flowchart illustrating the process of a user using a plurality of applications present across a plurality of devices, wherein supplementary rules may be associated with the device context information, according to embodiments as disclosed herein. Consider a case where supplementary rules are associated with the device context information, as provisioned during multiple ongoing calls. The communication coordination module 101 applies (1001) rules to both the current device (device_2) and the previous device (device_1). The rules may be associative to the device. The aggregation of the rules may satisfy the following criteria:

a configurable option to define precedence of presence states (Severest state/Most recent to take precedence)

a configurable option for mutually distributive adoption of rules sets provided by:

$$Device\_2\_Pr\_Suppl\_Rules^{Priority(topmost-N)} \setminus Device\_1\_Pr\_Suppl\_Rules^{Priority(topmost)}$$

wherein the resulting rules of the above equation will be applied specific to device_2, if these rules are associative to the device.

$$Device\_1\_Pr\_Suppl\_Rules^{Priority(topmost)}$$

wherein the resulting rules may be applied to both Device_1 and Device_2, if these rules are associative to the device.

On applying the rules, the communication coordination module 101 checks (1002) if the 'mutually distributive' option is enabled. If the 'mutually distributive' option is enabled, the communication coordination module 101 applies (1003) the rules associated to higher precedence to all devices. The communication coordination module 101 applies (1004) only the set difference resulting rules for a particular device (while the difference is measured against the rules of top priority device) will be applied to that particular device. If the 'mutually distributive' option is not enabled, the communication coordination module 101 applies (1005) the Device_1_Pr_Suppl_Rules$^{Priority(topmost)}$ rules to all devices. The various actions in method 1000 may be performed in the order presented, in a different order or simultaneously. Further, in some embodiments, some actions listed in FIG. 10 may be omitted.

Embodiments disclosed herein enable coordination between multiple devices and applications of a user, and thus obtain a reliable, accurate snapshot of the various parameters such as user availability, call type, media in use, schedule and so on, while providing the user with a seamless experience across the devices and applications. Embodiments disclosed herein enable future device specific systems to efficiently manage the varying communication forms and modes.

Embodiments disclosed herein provide the communication network/system with collated information ensuring a seamless experience for the user, irrespective of the device or the application being used by the user.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A method for enabling use of a plurality of applications across a plurality of devices by a user, the method comprising:

checking for a communication state performed by a user, by a communication coordination module, on the user starting to use a device, wherein said device is a current device used by the user;

applying at least one of a supplementary rule, by the communication coordination module, in context to said communication state based on the capabilities common between said current device and a previous device;

fetching a data structure of said previous device used by the user, by the communication coordination module, wherein said data structure comprises at least one of a user information, a user presence information and a device context, wherein said supplementary rule associated with said user information in said data structure further comprises:
- creating a holistic rule set for all supplementary rules on all devices of the user by the communication coordination module; and
- prioritizing rules by the communication coordination module in the holistic rule set based on at least one pre-configured criteria set by the user, on the communication coordination module detecting a coexistence of at least one rule in the rule set,
- applying the fetched data structure to the device by the communication coordination module; and
- sending an indication by the device to the communication coordination module, on the application of said supplementary rule being completed.

2. The method as claimed in claim 1, wherein the at least one pre-configured criteria depends on severity of presence state.

3. The method as claimed in claim 1, wherein the at least one pre-configured criteria is as per rule definition.

4. The method as claimed in claim 1, wherein applying said supplementary rule associated with the user presence information field in the data structure further comprises:
- applying Device_Pr_Suppl_RulesPriority(topmost) rules to all devices belonging to the user by the communication coordination module, on 'mutually distributive' option not being enabled;
- applying rules associated to higher precedence to all devices belonging to the user by the communication coordination module, on 'mutually distributive' option being enabled; and
- applying set difference resulting rules to each device belonging to the user by the communication coordination module, on 'mutually distributive' option not being enabled.

5. The method as claimed in claim 4, wherein the at least one supplementary rule comprises:
- a configurable option to define precedence of presence states, wherein the precedence is at least one of severest state to take precedence and most recent state to take precedence;
- a configurable option for mutually distributive adoption of rules sets provided by:

$$Device\_Pr\_Suppl\_Rules^{Priority(topmost-N)} \setminus Device\_Previous\_Pr\_Suppl\_Rules^{Priority(topmost)}$$

wherein the resulting rules of the above equation will be is applied specific to the device, if these rules are associative to the device;

$$Device\_1\_Pr\_Suppl\_Rules^{Priority(topmost)}$$

wherein the resulting rules is applied to the device and the previous device, if these rules are associative to the device.

6. The method as claimed in claim 4, wherein the set difference resulting rules are measured against rules of a top priority device.

7. The method as claimed in claim 1, wherein applying said supplementary rule associated with the a device context information field in the data structure, further comprises:
- applying Device_Pr_Suppl_RulesPriority(topmost) rules to all devices belonging to the user, by the communication coordination module, on 'mutually distributive' option not being enabled;
- applying rules associated to higher precedence to all devices belonging to the user, by the communication coordination module, on 'mutually distributive' option being enabled; and
- applying set difference resulting rules to each device belonging to the user by the communication coordination module, on 'mutually distributive' option not being enabled.

8. The method as claimed in claim 7, wherein the at least one supplementary rule comprises:
- a configurable option to define precedence of presence states, wherein the precedence is at least one of severest state to take precedence and most recent state to take precedence;
- a configurable option for mutually distributive adoption of rules sets provided by:

$$Device\_Pr\_Suppl\_Rules^{Priority(topmost-N)} \setminus Device\_Previous\_Pr\_Suppl\_Rules^{Priority(topmost)}$$

wherein the resulting rules of the above equation is applied specific to the device, if these rules are associative to the device;

$$Device\_1\_Pr\_Suppl\_Rules^{Priority(topmost)}$$

wherein the resulting rules is applied to the device and the previous device, if these rules are associative to the device.

9. The method as claimed in claim 7, wherein the set difference resulting rules are measured against rules of a top priority device.

10. A system for enabling use of a plurality of applications across a plurality of devices by a user, the system comprising of a communication coordination module, the communication coordination module configured to:
- check for a communication event performed by a user, on the user starting to use a device, wherein said device is a current device used by the user;
- apply at least one of a supplementary rule in context to said communication state based on the capabilities common between said current device and a previous device;
- fetch a data structure of said previous device used by the user, wherein said data structure comprises at least one of a user information, a user presence information and a device context, wherein said supplementary rules associated with said user information in said data structure further comprises:
  - creating a holistic rule set for all supplementary rules on all devices of the user by the communication coordination module; and
  - prioritizing rules by the communication coordination module in the holistic rule set based on at least one pre-configured criteria set by the user, on the communication coordination module detecting a coexistence of at least one rule in the rule set;
- apply the fetched data structure to the device by the communication coordination module; and
- send an indication by the device to the communication coordination module, on the application of said supplementary rule being completed.

11. The system as claimed in claim 10, wherein at least one pre-configured criteria depends on severity of presence state.

12. The system as claimed in claim 10, wherein at least one pre-configured criteria is as per rule definition.

13. The system as claimed in claim 10, wherein applying said supplementary rule associated with the user presence information field in the data structure further comprises:

applying Device_Pr_Suppl_RulesPriority(topmost) rules to all devices belonging to the user, by the communication coordination module, on 'mutually distributive' option not being enabled;

applying rules associated to higher precedence to all devices belonging to the user, by the communication coordination module, on 'mutually distributive' option being enabled; and applying set difference resulting rules to each device belonging to the user, by the communication coordination module, on 'mutually distributive' option not being enabled.

14. The system as claimed in claim 13, wherein the at least one supplementary rule comprises:
- a configurable option to define precedence of presence states, wherein the precedence is at least one of severest state to take precedence and most recent state to take precedence;
- a configurable option for mutually distributive adoption of rules sets provided by:

$$Device\_Pr\_Suppl\_Rules^{Priority(topmost-N)} \backslash Device\_Previous\_Pr\_Suppl\_Rules^{Priority(topmost)}$$

wherein the resulting rules of the above equation will be applied specific to the device, if these rules are associative to the device;

$$Device\_1\_Pr\_Suppl\_Rules^{Priority(topmost)}$$

wherein the resulting rules is applied to the device and the previous device, if these rules are associative to the device.

15. The system as claimed in claim 13, wherein the set difference resulting rules are measured against rules of a top priority device.

16. The system as claimed in claim 10, wherein applying said supplementary rule associated with the device context information field in the data structure comprises:

applying Device_Pr_Suppl_RulesPriority(topmost) rules to all devices belonging to the user, by the communication coordination module, on 'mutually distributive' option not being enabled;

applying rules associated to higher precedence to all devices belonging to the user, by the communication coordination module, on 'mutually distributive' option being enabled; and applying set difference resulting rules to each device belonging to the user, by the communication coordination module, on 'mutually distributive' option not being enabled.

17. The system as claimed in claim 16, wherein the at least one supplementary rule comprises:
- a configurable option to define precedence of presence states, wherein the precedence is at least one of severest state to take precedence and most recent state to take precedence;
- a configurable option for mutually distributive adoption of rules sets provided by:

$$Device\_Pr\_Suppl\_Rules^{Priority(topmost-N)} \backslash Device\_Previous\_Pr\_Suppl\_Rules^{Priority(topmost)}$$

wherein the resulting rules of the above equation is applied specific to the device, if these rules are associative to the device;

$$Device\_1\_Pr\_Suppl\_Rules^{Priority(topmost)}$$

wherein the resulting rules is applied to the device and the previous device, if these rules are associative to the device.

18. The system as claimed in claim 16, wherein the set difference resulting rules are measured against rules of a top priority device.

* * * * *